US011835788B2

(12) United States Patent
Seo et al.

(10) Patent No.: US 11,835,788 B2
(45) Date of Patent: Dec. 5, 2023

(54) CAMERA MODULE AND ELECTRONIC DEVICE INCLUDING THE SAME

(71) Applicant: Samsung Electro-Mechanics Co., Ltd., Suwon-si (KR)

(72) Inventors: Bo Sung Seo, Suwon-si (KR); Jung Seok Lee, Suwon-si (KR); Young Bok Yoon, Suwon-si (KR); Nam Ki Park, Suwon-si (KR); Byung Hoon Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 393 days.

(21) Appl. No.: 17/150,373

(22) Filed: Jan. 15, 2021

(65) Prior Publication Data

US 2021/0271049 A1 Sep. 2, 2021

(30) Foreign Application Priority Data

Feb. 28, 2020 (KR) .......................... 10-2020-0025370
Jun. 15, 2020 (KR) .......................... 10-2020-0072498

(51) Int. Cl.
*G02B 7/09* (2021.01)
*G02B 27/64* (2006.01)
(Continued)

(52) U.S. Cl.
CPC ............. *G02B 7/09* (2013.01); *G02B 27/646* (2013.01); *G03B 5/00* (2013.01); *G03B 13/36* (2013.01); *G03B 2205/0007* (2013.01)

(58) Field of Classification Search
None
See application file for complete search history.

(56) References Cited

U.S. PATENT DOCUMENTS 10,747,013 B2 * 8/2020 Lim .................. H04N 23/687
2007/0047942 A1 3/2007 Chang et al.
(Continued)

FOREIGN PATENT DOCUMENTS

CN 101183203 A 5/2008
JP 2015-026085 A 2/2015
(Continued)

OTHER PUBLICATIONS

Chinese Office Action dated Jan. 29, 2022 in the corresponding Chinese Patent Application No. 202110217084.4. (13 pages in English and 12 pages in Chinese).
(Continued)

*Primary Examiner* — Stephone B Allen
*Assistant Examiner* — Tamara Y. Washington
(74) *Attorney, Agent, or Firm* — NSIP Law

(57) ABSTRACT

A camera module is provided. The camera module includes a housing; a focus adjustment unit disposed in the housing; and a shake correction unit disposed in the housing, wherein the housing includes a first shake correction driving magnet and second shake correction driving magnet that provide a driving force to move the shake correction unit in a first direction intersecting an optical axis and a second direction intersecting the optical axis and the first direction, and a focus adjustment driving coil providing a driving force to move the focus adjustment unit in the optical axis direction. The housing further includes first to third yokes respectively disposed on a surface of the first magnet, a surface of the second magnet, and a surface of the focus adjustment driving coil.

17 Claims, 10 Drawing Sheets

(51) Int. Cl.
  *G03B 5/00*   (2021.01)
  *G03B 13/36*  (2021.01)

(56) References Cited

U.S. PATENT DOCUMENTS

| | | |
|---|---|---|
| 2015/0049209 A1 | 2/2015 | Hwang et al. |
| 2017/0139225 A1 | 5/2017 | Lim |
| 2019/0369678 A1 | 12/2019 | Park et al. |
| 2022/0035173 A1* | 2/2022 | Min ........................ H04N 23/57 |

FOREIGN PATENT DOCUMENTS

| | | |
|---|---|---|
| KR | 10-2013-0013323 A | 2/2013 |
| KR | 10-2015-0020951 A | 2/2015 |
| KR | 10-2017-0056387 A | 5/2017 |
| KR | 10-2018-0024145 A | 3/2018 |
| KR | 10-2018-0116965 A | 10/2018 |
| KR | 10-2019-0137657 A | 12/2019 |
| TW | 200708873 A | 8/2005 |

OTHER PUBLICATIONS

Korean Office Action dated Jul. 2, 2021 in counterpart Korean Patent Application No. 10-2020-0072498 (10 pages in English and 7 pages in Korean).

\* cited by examiner

CAMERA MODULE AND ELECTRONIC DEVICE INCLUDING THE SAME

CROSS-REFERENCE TO RELATED APPLICATION(S)

This application claims the benefit under 35 USC § 119(a) of priority to Korean Patent Application No. 10-2020-0025370 filed on Feb. 28, 2020, and Korean Patent Application No. 10-2020-0072498 filed on Jun. 15, 2020, in the Korean Intellectual Property Office, the disclosures of which are incorporated herein by reference for all purposes.

BACKGROUND

1. Field

The following description relates to a camera module, and an electronic device including the same.

2. Description of Related Art

Micro-camera modules have been implemented in mobile communication terminal devices (electronic devices) such as smartphones, tablet personal computers (PCs), and laptops.

As mobile communication terminal devices are being manufactured with reduced sizes, image quality may deteriorate due to handshake during the imaging of an object. Therefore, a technique for correcting handshake may be beneficial to obtain a clear image.

When handshake occurs during the imaging of an object, an optical image stabilization (OIS) actuator to which an OIS technique is applied, may be used to correct handshake. An OIS actuator may move a lens module in a direction perpendicular to an optical axis.

Recently, a structure in which a plurality of cameras including a wide-angle camera and a telephoto camera are installed adjacent to each other in a mobile terminal has been implemented to improve performance of a camera function.

However, when an OIS actuator implementing a magnet and a coil is employed for miniaturization and accurate driving, performance may degrade due to magnetic interference between adjacent camera modules.

The above information disclosed in this Background section is only for enhancement of understanding of the background of the described technology, and therefore it may contain information that does not form the prior art that is already known in this country to a person of ordinary skill in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes a housing; a focus adjustment unit disposed in the housing; and a shake correction unit disposed in the housing, wherein the housing includes a first shake correction driving magnet and a second shake correction driving magnet, each configured to provide a driving force to move the shake correction unit in a first direction, intersecting an optical axis, and a second direction, intersecting the optical axis and the first direction, and a focus adjustment driving coil, configured to provide a driving force to move the focus adjustment unit in the optical axis direction, and wherein the housing further comprises first to third yokes respectively disposed on a surface of the first magnet, a surface of the second magnet, and a surface of the focus adjustment driving coil.

The housing may be configured to have a polygonal box shape, and the first to third yokes may be disposed on respective surfaces of the housing, and are disposed in parallel to the optical axis direction.

The focus adjustment unit may include a carrier disposed on a surface of the housing, and the carrier may include a focus adjustment driving magnet which opposes a focus adjustment driving coil.

The carrier may be supported by the surface of the housing based on an attractive force between the focus adjustment driving magnet and the third yoke.

The shake correction unit may include a lens holder, configured to hold at least one lens, and lens holder may include a first coil that opposes the first magnet, and a second coil that opposes the second magnet.

The first coil and the second coil may be connected to a flexible substrate.

The flexible substrate may be connected to a sensor substrate in which an image sensor is mounted.

At least a portion of a connection line and a power line may be separated from each other in the flexible substrate.

The first to third yokes may each be configured to have a size that is greater than a respective size of the first magnet, the second magnet, and the focus adjustment driving coil.

The focus adjustment unit may include a carrier disposed on a first surface of the housing, the shake correction unit and the carrier selectively may include a first magnetic material and a second magnetic material, and the shake correction unit may be supported by a bottom surface of the carrier based on an attractive force of the first magnetic material and the second magnetic material.

The carrier may be supported by a surface of the housing disposed in parallel to the optical axis direction with a ball member interposed therebetween.

The shake correction unit may include a frame disposed in an upper portion of the carrier in the optical axis direction, and a lens holder disposed in an upper portion of the frame in the optical axis direction.

A first ball member may be disposed between the frame and the lens holder, and a second ball member may be disposed between the carrier and the frame.

In a general aspect, a camera module includes a housing; a focus adjustment unit disposed in the housing; and a shake correction unit disposed in the focus adjustment unit, wherein the focus adjustment unit includes a carrier disposed in the housing, and configured to move in an optical axis direction, wherein the shake correction unit includes a frame disposed in an upper portion of the carrier in the optical axis direction, and a lens holder disposed in an upper portion of the frame in the optical axis direction, wherein the frame and the lens holder are configured to move in first and second directions intersecting the optical axis direction based on an interaction between a shake correction driving coil and a shake correction driving magnet, wherein the shake correction unit and the carrier selectively include a first magnetic material and a second magnetic material, and wherein the shake correction unit is supported by a bottom surface of the carrier based on an attractive force of the first magnetic material and the second magnetic material.

The first magnetic material may be a pulling magnet, and the second magnetic material may be a pulling yoke.

In a general aspect, a plurality of camera modules, each configured to have a different field of view, wherein at least one of the plurality of camera modules includes a housing; a focus adjustment unit disposed in the housing; and a shake correction unit disposed in the housing, wherein the housing includes: a first shake correction driving magnet and a second shake correction driving magnet, each configured to provide a driving force to move the shake correction unit in a first direction, that intersects an optical axis, and a second direction, that intersects the optical axis and the first direction, and a focus adjustment driving coil, configured to provide a driving force to move the focus adjustment unit in the optical axis direction, and wherein the housing further includes first to third yokes respectively disposed on a surface of the first magnet, a surface of the second magnet, and a surface of the focus adjustment driving coil.

In a general aspect, a portable electronic device includes a plurality of camera modules, each configured to have a different field of view, wherein at least one of the plurality of camera modules includes a housing; a focus adjustment unit disposed in the housing; and a shake correction unit disposed in the focus adjustment unit, wherein the focus adjustment unit comprises a carrier disposed in the housing, and configured to move in an optical axis direction, wherein the shake correction unit comprises a frame disposed in an upper portion of the carrier in the optical axis direction, and a lens holder disposed in an upper portion of the frame in the optical axis direction, wherein the frame and the lens holder are configured to move in first and second directions intersecting the optical axis direction based on an interaction between a shake correction driving coil and a shake correction driving magnet, wherein the shake correction unit and the carrier selectively include a first magnetic material and a second magnetic material, and wherein the shake correction unit is supported by a bottom surface of the carrier based on an attractive force of the first magnetic material and the second magnetic material.

Other features and aspects will be apparent from the following detailed description, the drawings, and the claims.

Figure 1:
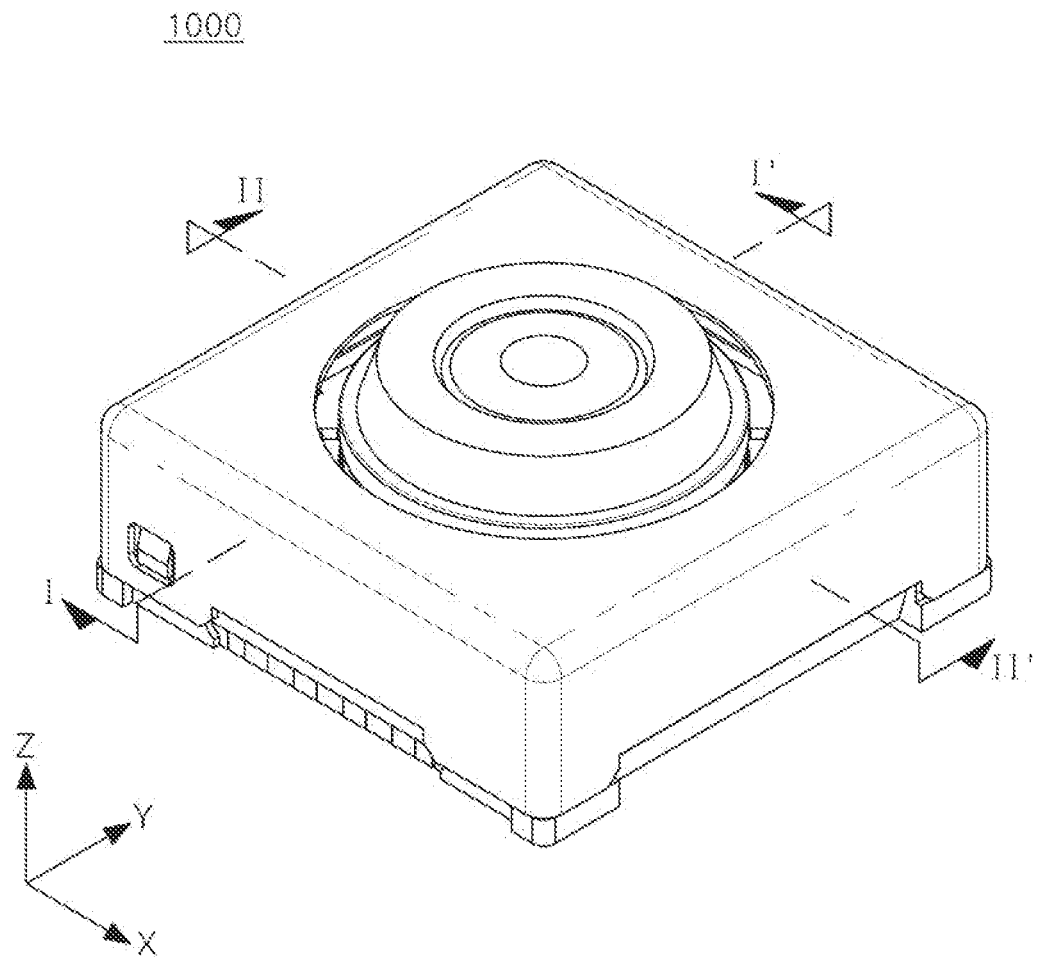
FIG. 1 illustrates a perspective view illustrating an example camera module, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

The examples relate to a lens driving device and a camera module including the same. In a non-limiting example, the camera module may be applied to portable electronic devices such as, but not limited to, mobile communication terminals, smartphones, tablet PCs, and similar devices.

The camera module may be an optical device that captures an image or a video, and may include a lens that refracts light reflected from a subject, and a lens driving device which may move the lens to adjust a focus or to correct shake.

Figure 2:
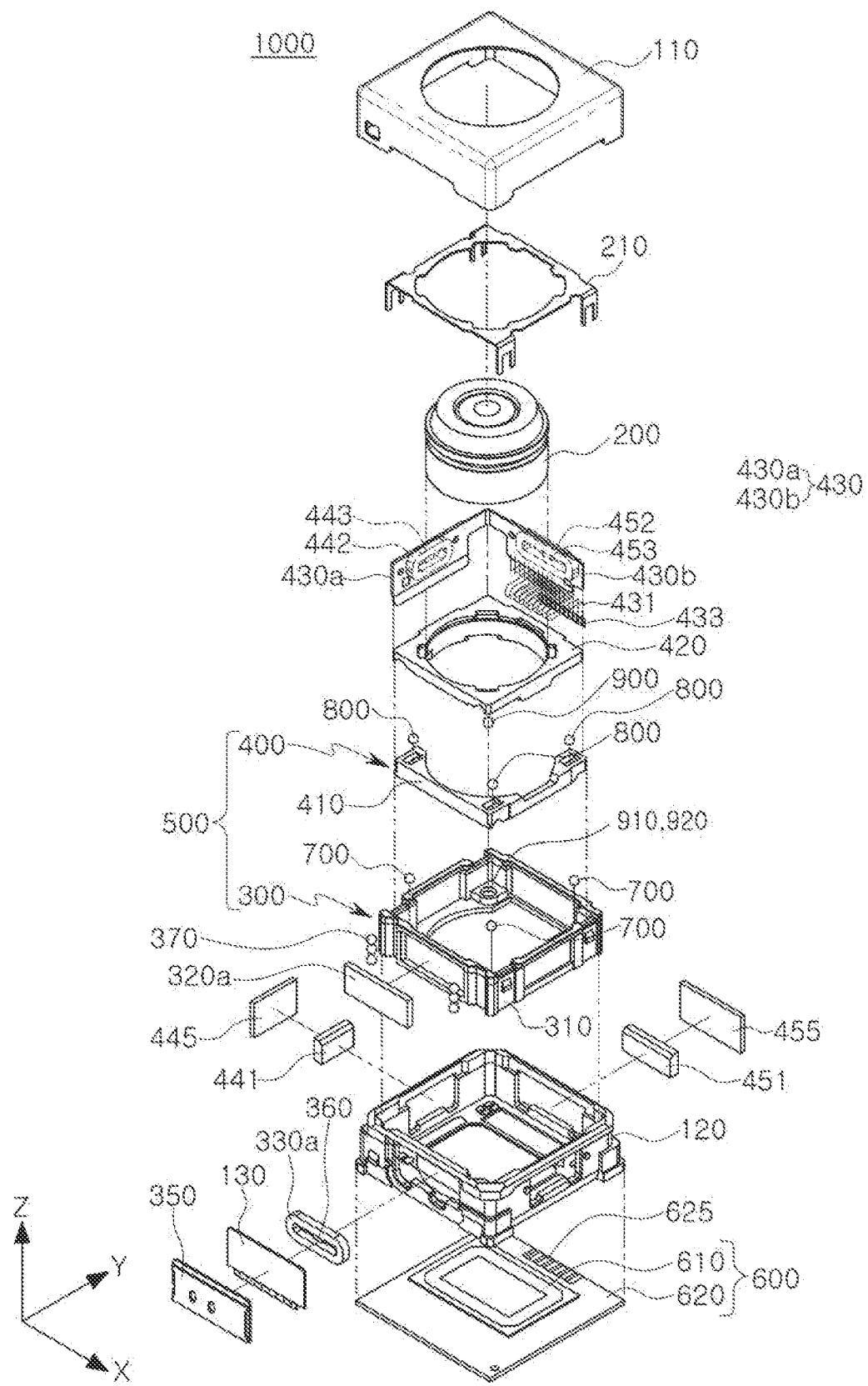
FIG. 2 illustrates an exploded perspective view of an example camera module, in accordance with one or more embodiments.

FIG. 1 illustrates a perspective view of an example camera module, in accordance with one or more embodiments. FIG. 2 illustrates an exploded perspective view of an example camera module, in accordance with one or more embodiments.

Referring to FIGS. 1 and 2, a camera module 1000, in accordance with an example, may include a lens barrel 200, a lens driving device 500 that moves the lens barrel 200, an image sensor unit 600 that converts light incident through the lens barrel 200 into an electrical signal, a housing 120 that accommodates the lens barrel 200 and the lens driving device 500, and a case 110.

The housing 120 may have a hollow box shape, and may be, for example, a polygonal (square) box shape. An upper portion of the housing 120 may be covered by the case 110.

The lens barrel 200 may have a hollow cylindrical shape such that a plurality of lenses for imaging a subject may be accommodated therein, and the plurality of lenses may be mounted on the lens barrel 200 along an optical axis.

A predetermined number of the plurality of lenses may be arranged according to a design of the lens barrel 200, and the lenses may have optical characteristics such as the same refractive index or different refractive indices.

The lens driving device 500 may be configured to move the lens barrel 200.

In an example, the lens driving device 500 may adjust a focus by moving the lens barrel 200 in the optical axis (the Z axis) direction, and may correct shake in imaging by moving the lens barrel 200 in a direction intersecting the optical axis (the Z axis), a direction perpendicular to the optical axis (the Z axis), for example.

The lens driving device 500 may include a focus adjustment unit 300 that adjusts a focus, and a shake correction unit 400 that corrects shake.

The image sensor unit 600 may be configured to convert light incident through the lens barrel 200 into an electrical signal.

In an example, the image sensor unit 600 may include an image sensor 610 and a printed circuit board 620 connected to the image sensor 610, and may further include an optical filter, such as an infrared filter, for example.

The filter may block a specific range of light incident through the lens barrel 200, and the infrared filter may be configured to block light in an infrared range.

The image sensor 610 may convert the light incident through the lens barrel 200 into an electrical signal.

The electrical signal converted by the image sensor 610 may be output as an image through a display unit of a portable electronic device. The image sensor 610 may be fixed to the printed circuit board 620, and may be electrically connected to the printed circuit board 620 by wire bonding.

The lens barrel 200 and the lens driving device 500 may be accommodated in the housing 120. In an example, the housing 120 may have open upper and lower portions, and the lens barrel 200 and the lens driving device 500 may be accommodated in the housing 120. The image sensor unit 600 may be disposed below the housing 120.

The case 110 may be coupled to the housing 120 to surround an external surface of the housing 120, and may be configured to protect the internal components of the camera module. Additionally, the case 110 may be configured to shield electromagnetic waves. In an example, the case 110 may shield electromagnetic waves such that the electromagnetic waves generated from the camera module may not affect the other electronic components disposed in the portable electronic device.

Additionally, as various electronic components other than the camera module are mounted on the portable electronic device, the case 110 may shield the electromagnetic waves such that electromagnetic waves generated from the electronic components may not affect the camera module.

The case 110 may be formed of a metal material and may be grounded to a ground pad provided on the printed circuit board 620, thereby shielding electromagnetic waves.

Figure 3:
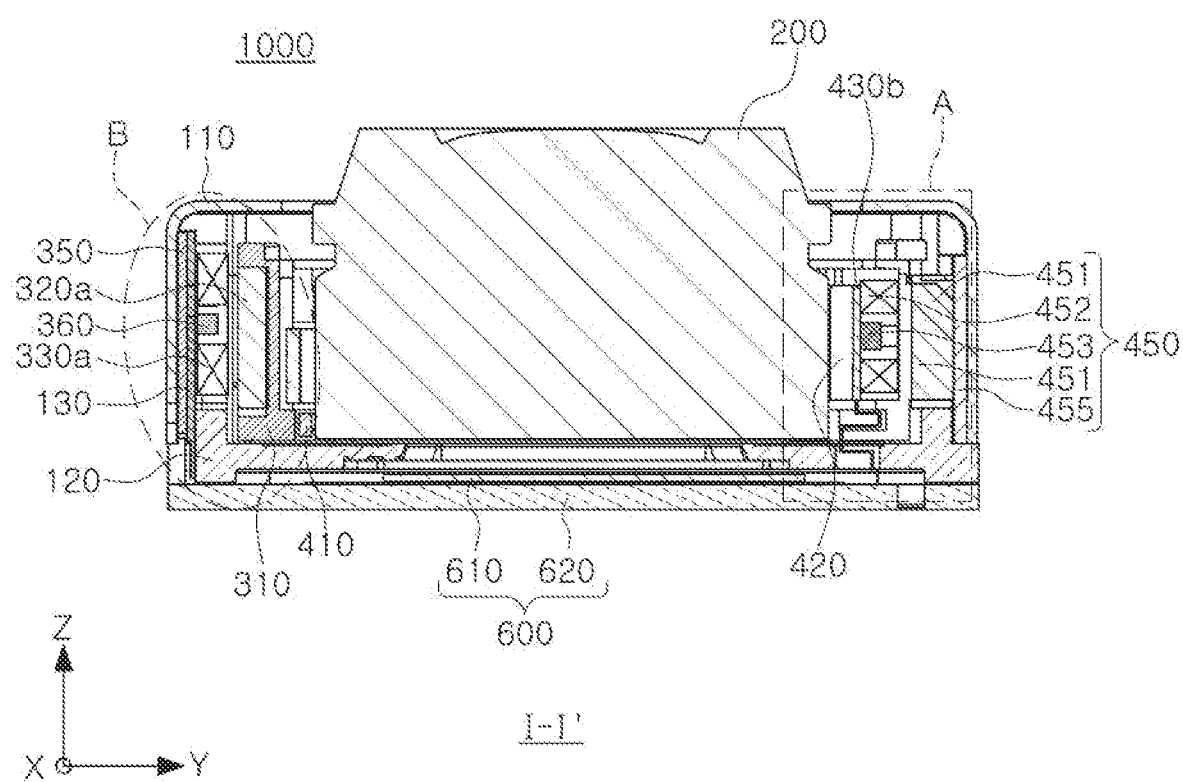
FIG. 3 illustrates a cross-sectional view taken along line I-I' in FIG. 1.
Figure 4A:
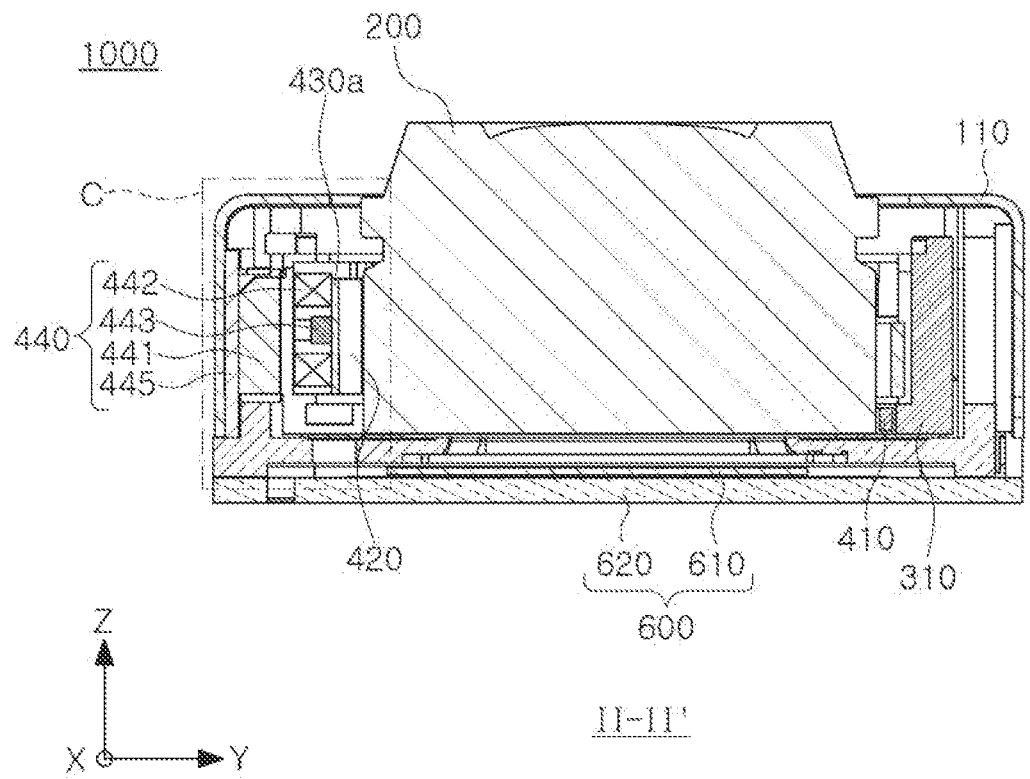
FIG. 4A illustrates a cross-sectional view taken along line II-II' in FIG. 1.
Figure 6:
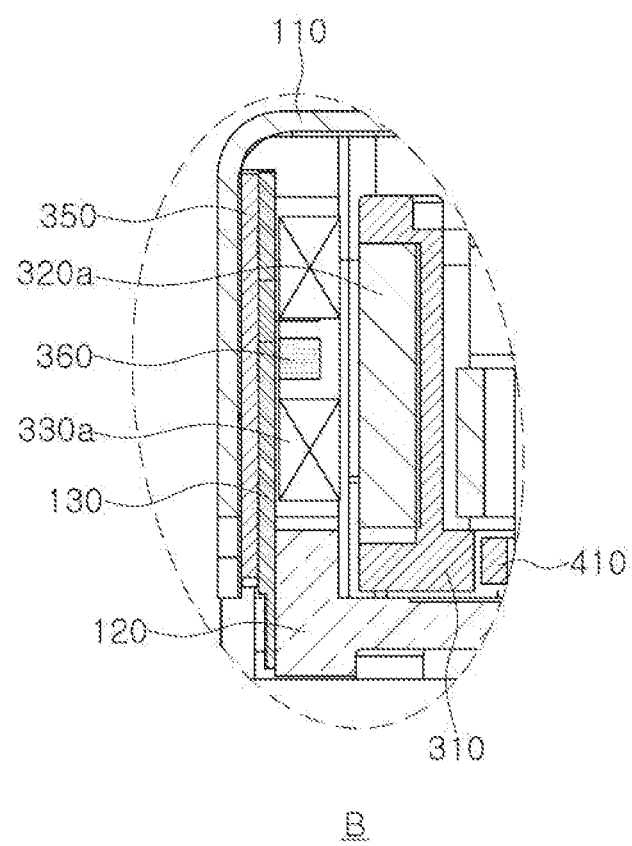
FIG. 6 illustrates a schematic enlarged view illustrating portion "B" illustrated in FIG. 4.

FIG. 3 illustrates a cross-sectional view taken along line I-I' in FIG. 1. FIG. 4A illustrates a cross-sectional view taken along line II-II' in FIG. 1. FIG. 6 illustrates a schematic enlarged view illustrating portion "B" illustrated in FIG. 4

The focus adjustment unit 300 of the lens driving device 500 of the example embodiment will be described with reference to FIGS. 3, 4A, 4B, and 6.

In the lens driving device 500 in the example, the lens barrel 200 may move to focus on a subject.

In an example, in the example embodiment, a focus adjustment unit 300 for moving the lens barrel 200 in the optical axis (Z axis) direction may be included.

The focus adjustment unit 300 may include the carrier 310 accommodating the lens barrel 200, and a focus adjustment driving unit that generates a driving force to move the lens barrel 200 and the carrier 310 in the optical axis (Z axis) direction.

The focus adjustment driving unit may include a magnet 320a and a coil 330a. The magnet 320a and the coil 330a may be provided to oppose each other in a direction perpendicular to the optical axis (the Z axis). In an example, the magnet 320a and the coil 330a may be selectively disposed substantially parallel to each other on surfaces of the carrier 310 and the housing 120 disposed parallel to the optical axis direction, respectively.

In an example, the magnet 320a may be mounted on the carrier 310. In an example, the magnet 320a may be mounted on one surface of the carrier 310.

The coil 330a may be mounted on the housing 120. In an example, the coil 330a may be mounted on the housing 120 via the substrate 130. The coil 330a may be fixed to the housing 120 via the substrate 130 and may be disposed in a position facing the magnet 451 of the shake correction unit 400 in the housing 120.

The magnet 320a may be configured as a moving member when mounted on the carrier 310, and may move in the optical axis (the Z axis) direction along with the carrier 310, and the coil 330a may be a fixed member, fixed to the housing 120. However, an example thereof is not limited thereto, and the positions of the magnet 320a and the coil 330a may be switched in relation to each other.

When power is applied to the coil 330a, the carrier 310 may move in the optical axis (the Z axis) direction by an electromagnetic force formed or generated between the magnet 320a and the coil 330a.

Since the lens barrel 200 is accommodated in the carrier 310, the lens barrel 200 may also move in the optical axis (the Z axis) direction based on the movement of the carrier 310.

When the carrier 310 moves, a rolling member 370 may be disposed between the carrier 310 and the housing 120 to reduce friction between the carrier 310 and the housing 120. The rolling member 370 may have a ball shape.

The rolling member 370 may be disposed on both sides of the magnet 320a.

A first yoke 350 may be disposed in the housing 120. For example, the first yoke 350 may be attached to an external surface of the housing 120, and may be disposed to face the magnet 320a, with the coil 330a interposed therebetween. The first yoke 350 may have a width or a height greater than a width or a height of the magnet 320a to surround the entire magnet 320a.

An attractive force may be generated in a direction perpendicular to the optical axis (Z axis) between the first yoke 350 and the magnet 320a. Accordingly, the rolling member 370 may be supported by the attractive force formed between the first yoke 350 and the magnet 320a while maintaining a contact state with the carrier 310 and the housing 120.

The first yoke 350 may also be implemented to focus the magnetic force of the magnet 320a, and may prevent a magnetic field formed by the magnet 320a or the coil 330a included in the focus adjustment driving unit from leaking out of the housing 120, leakage of magnetic field. Accordingly, even when the other camera module installed adjacently are adjacent to the surface on which the focus adjustment driving unit is installed, the camera module may not be affected by the focus adjustment driving unit. The first yoke 350 may be formed of a magnetic material made of a metal or non-metal.

In the example, a closed-loop control method of sensing a position of the lens barrel 200 and providing a feedback may be implemented. Therefore, a position sensor 360 may be necessary for the closed-loop control. The position sensor 360 may be a hall sensor.

The position sensing sensor 360 may be disposed inside or outside the coil 330a, and the position sensing sensor 360 may be mounted on the substrate 130 on which the coil 330a is mounted.

When the power of the camera module is turned on, an initial position of the lens barrel 200 may be detected by the position sensor 360. Thereafter, the lens barrel 200 may move from the sensed initial position to an initial setting position. The initial position may refer to a position of the lens barrel 200 in the optical axis direction when the camera module is turned on, and the initial setting position may refer to a position in which the focus of the lens barrel 200 becomes infinite.

The lens barrel 200 may move from the initial setting position to the target position by a driving signal of a circuit device.

In the focus adjustment process, the lens barrel 200 may move forward and backward in the optical axis (Z axis) direction (that is, the lens barrel 200 may perform bidirectional movement).

Figure 4B:
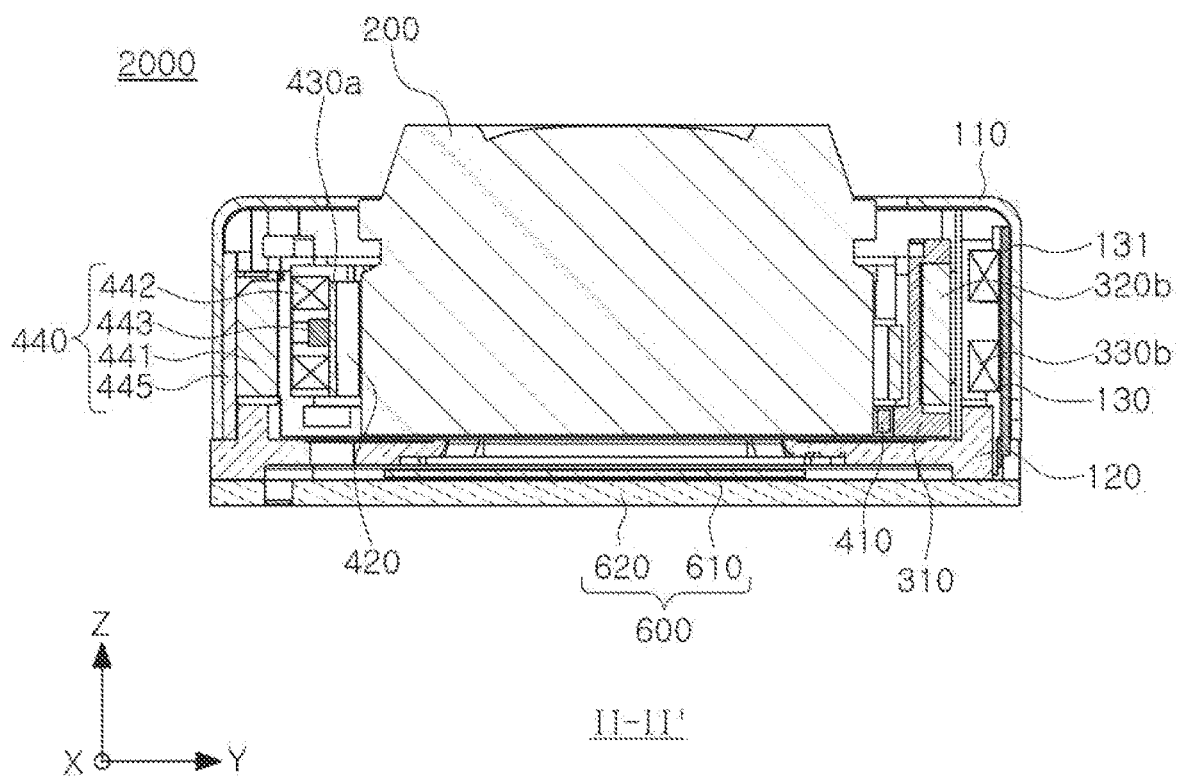
FIG. 4B illustrates a cross-sectional view taken along line II-II' in FIG. 1, in accordance with one or more embodiments.

FIG. 4B illustrates a cross-sectional view taken along line II-II' in FIG. 1 in accordance with one or more embodiments.

Referring to FIG. 4B, a camera module 2000, in another example, may further include a magnet 320b and a coil 330b to secure a sufficient driving force during focus adjustment. In an example, the coil 330b may be fixed to the housing via the substrate 131.

When an area in which a magnet is mounted is decreased, according to the trend of slimming of the camera module, a size of the magnet may decrease such that sufficient driving force for focus adjustment may not be secured.

However, in the example embodiment, the magnets 320a (FIG. 2) and 320b may be attached to different surfaces of the carrier 310, coils may be provided on different surfaces of the housing 120 to face the magnets 320a and 320b, thereby securing sufficient driving force required for the focus adjustment, even when the camera module has a reduced size.

The camera module 2000 in another example may or may not have a yoke on a rear surface of the coil 330b. When a yoke is provided, a ball member may be interposed between the carrier 310 and the housing 120. In an example, in the case in which the housing has a square box shape, all side surfaces may be covered by the yoke.

Figure 5A:
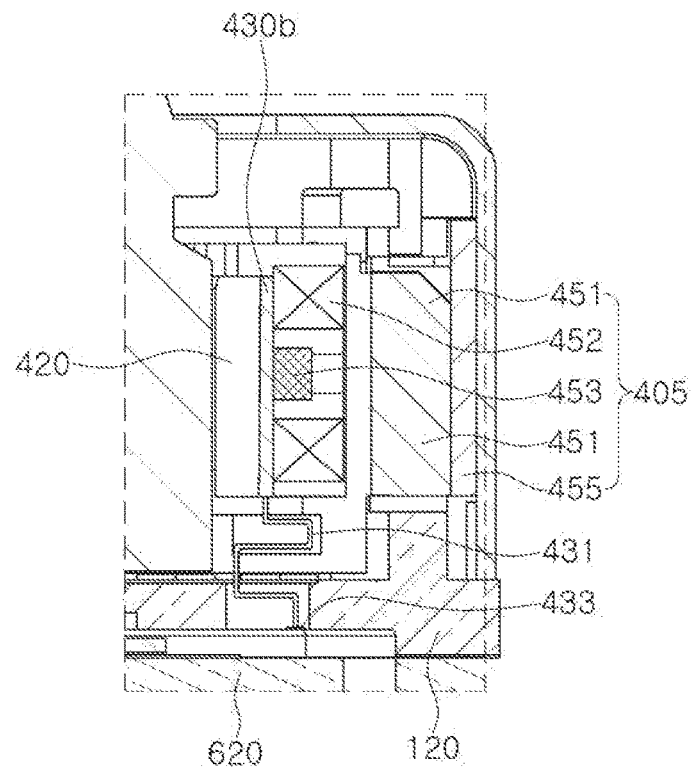
FIG. 5A illustrates a schematic enlarged view illustrating portion "A" illustrated in FIG. 3.
Figure 5B:
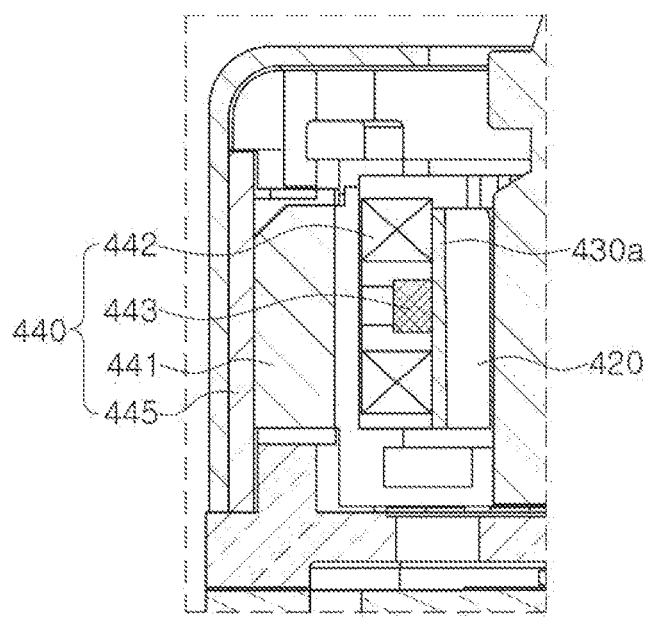
FIG. 5B illustrates a schematic enlarged view illustrating portion "C" illustrated in FIG. 4.

FIG. 3 illustrates a cross-sectional view taken along line I-I' in FIG. 1. FIG. 4A is a cross-sectional view taken along line II-II' in FIG. 1. FIG. 5A is a schematic enlarged view illustrating portion "A" illustrated in FIG. 3. FIG. 5B is a schematic enlarged view illustrating portion "C" illustrated in FIG. 4.

The shake correction unit of the example will be described with reference to FIGS. 3, 4A, 5A, and 5B.

The shake correction unit 400 may be used to correct blurring of an image or shake of a video due to factors such as hand-shake of a user during the capturing of an image or a video.

In an example, the shake correction unit 400 may compensate for shake by applying a relative displacement corresponding to the shake to the lens barrel 200 when shake occurs due to shaking of the user's hand during imaging.

In an example, the shake correction unit 400 may move the lens module including the lens barrel 200 in a direction intersecting the optical axis (the Z axis), a direction perpendicular to the optical axis (the Z axis), for example. The lens module may include a lens barrel 200 and a lens holder 420.

The shake correction unit 400 may include a guide member for guiding the movement of the lens barrel 200 and a shake correction driving unit for generating driving force to move the guide member in a direction perpendicular to the optical axis (the Z axis).

The guide member may include a frame 410 and a lens holder 420. The frame 410 and the lens holder 420 may be disposed in the carrier 310 in the optical axis (the Z axis) direction, and may be configured to guide the movement of the lens barrel 200.

The frame 410 and the lens holder 420 may have a space to which the lens barrel 200 may be inserted. The lens barrel 200 may be fixed to the lens holder 420 (see FIG. 2).

The frame 410 and the lens holder 420 may move in a direction intersecting, (or being perpendicular to), the optical axis (the Z axis) in the carrier 310 based on the driving force generated by the shake correction driving unit.

The shake correction driving unit may include a first shake correction driving unit 440 and a second shake correction driving unit 450, and the first and second shake correction driving units 440 and 450 may include respective magnets 441 and 451, and respective coils 442 and 452, respectively.

The first shake correction driving unit 440 may generate a driving force in a first axis (for example, the X axis) direction perpendicular to the optical axis (the Z axis), and the second shake correction driving unit 450 may generate driving force in a second axis (for example, the Y axis) direction perpendicular to the first axis (the X axis).

The second axis (the Y axis) may refer to an axis perpendicular to both the optical axis (the Z axis) and the first axis (the X axis).

The first shake correction driving unit 440 and the second shake correction driving unit 450 may be disposed to be orthogonal to each other on a plane perpendicular to the optical axis (Z axis). In an example, the magnet 441 of the first shake correction driving unit 440, and the magnet 451 of the second shake correction driving unit 450 may be disposed to be orthogonal to each other on a plane perpendicular to the optical axis (Z axis).

The coils 442 and 452 of the respective first and second shake correction driving units 440 and 450 may be mounted on the lens holder 420, and the magnets 441 and 451 opposing the coils 442 and 452, respectively, may be mounted on the housing 120. The coils 442 and 452 and the magnets 441 and 451 may be disposed substantially parallel to the optical axis, and may be disposed to oppose each other in a direction substantially intersecting (being perpendicular) to the optical axis.

In an example, the coils 442 and 452 may be mounted on the lens holder 420 via the substrates 430 (430a and 430b), and the magnets 441 and 451 may be mounted on the housing 120 to oppose the coils 442 and 452, respectively. The position detection sensors 443 and 453 may be provided on the substrate 430 in or adjacent to the coils 442 and 452, respectively.

The coils 442 and 452 may be moving members which may move in a direction perpendicular to the optical axis (the Z axis) along with the lens holder 420, and the magnets 441 and 451 may be fixed members which are fixed to the housing 120. When the position sensors 443 and 453 are provided, the position sensors may also be moving members which may move in a direction perpendicular to the optical axis (the Z axis).

Yokes 445 and 455 may be disposed in the housing 120. In an example, the yokes 445 and 455 may be attached to an external surface of the housing 120, and may be attached to the housing 120 to be in close contact with external surfaces of the magnets 441 and 451 or to have a gap therebetween such that the yokes 445 and 455 may surround the magnets 441 and 451 externally. The yokes 445 and 455 may have a width or a height greater than a width or a height of the magnets 441 and 451 to surround the entire magnets 441 and 451.

In the example, as the coils 442 and 452 are provided on the moving member and the magnets 441 and 451 are provided on the fixing member, even when the yokes 445 and 455 are provided in the housing 120, which is a fixing member, the force drawing the lens holder 420, a moving member, may not be generated. Accordingly, even when the shake correction unit 400 is provided, a camera module in which magnetic field does not leak externally of the housing 120 may be implemented.

Specifically, in an example, the yokes 445 and 455 may also focus the magnetic force of the magnets 441 and 451, and may prevent magnetic field leakage by preventing magnetic fields formed by the magnets 441 and 451 or the coils 442 and 452 included in the shake correction driving unit from leaking out of the housing 120.

Accordingly, even when the other camera module installed adjacently are adjacent to the surface on which the shake correction driving unit is installed, the camera module may not be affected by the shake correction adjustment driving unit in the example embodiment. The yokes 445 and 455 may be formed of a magnetic material formed of metal or non-metal materials.

In the example, as the coils 442 and 452 are provided on the lens holder 420 which is a moving member, the substrate 430 on which the coils 442 and 452 are mounted may also move in a direction perpendicular to the optical axis direction along with the lens holder 420.

Accordingly, the connection line 431 extending from the substrate 430 to supply signals and power to the substrate 430 may have a structure which may be easily folded or bent or extended so as not to interfere with the movement of the lens holder 420. The connection line 431 may be a flexible substrate (FPCB). In an example, in the connection line 431, at least a portion of signal lines and power lines may be distinguished from each other such that the connection line 431 may have a plurality of strands. The connection line 431 may be connected to the coils 442 and 452.

In the example, although the substrate 430 in which the two substrates 430a and 430b including the coils 442 and 452 mounted thereon are connected to each other is illustrated, the substrates 430a and 430b may also not be connected to each other and may be separately provided, such that two substrates in which the coils 442 and 452 may be mounted may be provided. In this example, two connecting lines 431 may be provided so as to be drawn out from the substrates.

The connection line 431 may extend from the substrate 430, and may be connected to a terminal 625 of the printed circuit board 620, which is a sensor substrate on which the image sensor 610 is mounted. However, an example thereof is not limited thereto, and the connection line 431 may be directly connected to a device in which the camera module is installed.

In the example, a plurality of ball members supporting the shake correction unit 400 may be provided. The plurality of ball members may be configured to guide the frame 410 and the lens holder 420 in the shake correction process. The plurality of ball members may also be configured to maintain gaps among the carrier 310, the frame 410 and the lens holder 420.

The plurality of ball members may include one or more first ball members 700 and one or more second ball members 800.

The first ball member 700 may guide the movement of the shake correction unit 400 in the first axis (the X-axis) direction, and the second ball member 800 may guide the movement of the shake correction unit 400 in the second axis (the Y axis) direction.

In an example, the first ball member 700 may roll in the first axis (the X axis) direction when the driving force in the first axis (the X axis) direction. Accordingly, the first ball member 700 may guide the movement of the frame 410 and the lens holder 420 in the first axis (the X axis) direction.

The second ball member 800 may roll in the second axis (the Y axis) direction when the driving force is generated in the second axis (the Y axis) direction. Accordingly, the second ball member 800 may guide the movement of the lens holder 420 in the second axis (the Y-axis) direction.

In an example, the first ball member 700 may include a plurality of ball members disposed between the carrier 310 and the frame 410, and the second ball member 800 may include a plurality of ball members disposed between the frame 410 and the lens holder 420.

A first guide groove portion accommodating the first ball member 700 may be formed on surfaces of the carrier 310 and the frame 410 opposing each other in the optical axis (the Z-axis) direction, and the first ball member 700 may be accommodated in the first guide groove portion and may be interposed between the carrier 310 and the frame 410.

The movement of the first ball member 700 in the optical axis (the Z axis) direction and the second axis (the Y axis) direction may be limited while the first ball member 700 is accommodated in the first guide groove portion, and the first ball member 700 may only move in the first axis (the X axis) direction. In an example, the first ball member 700 may only roll in the first axis (the X axis) direction.

A second guide groove portion accommodating the second ball member 800 may be formed in surfaces of the frame 410 and the lens holder 420 opposing each other in the optical axis (the Z-axis) direction, and the second ball member 800 may be accommodated in the second guide groove portion and may be interposed between the frame 410 and the lens holder 420.

The movement of the second ball member 800 in the optical axis (the Z axis) direction and the first axis (the X axis) direction may be limited while the second ball member 800 is accommodated in the second guide groove portion, and the second ball member 800 may only move in the second axis (the Y axis) direction. In an example, the second ball member 800 may only roll in the second axis (the Y axis) direction.

In an example, a third ball member 900 that supports the movement of the lens holder 420 disposed between the carrier 310 and the lens holder 420 may be provided. The third ball member 900 may guide both the movement of the lens holder 420 in the first axis (X axis) direction and the second axis (Y axis) direction.

In an example, the third ball member 900 may roll in the first axis (the X axis) direction when a driving force is generated in the first axis (the X axis) direction. Accordingly, the third ball member 900 may guide the movement of the lens holder 420 in the first axis (the X-axis) direction.

The third ball member 900 may roll in the second axis (the Y axis) direction when a driving force is generated in the second axis (the Y axis) direction. Accordingly, the third ball member 900 may guide the movement of the lens holder 420 in the second axis (the Y-axis) direction.

The second ball member 800 and the third ball member 900 may be in contact with, and may support, the lens holder 420. The second ball member 800 and the third ball member 900 may be disposed in different positions in the optical axis direction (the Z axis direction).

A third guide groove that accommodates the third ball member 900 may be formed on surfaces of the carrier 310 and the lens holder 420 opposing each other in the optical axis (the Z axis) direction. The third ball member 900 may be accommodated in the third guide grooves 910 and 920 and may be interposed between the carrier 310 and the lens holder 420.

The movement of the third ball member 900 in the optical axis (the Z axis) direction may be limited while the third ball member 900 is accommodated in the third guide grooves 910 and 920, and the third ball member 900 may roll in the first axis (the X axis) and the second axis (the Y axis) directions. Accordingly, planar shapes of the third guide groove portions 910 and 920 may be circular.

The first ball member 700 may roll in the first axis (the X-axis) direction, the second ball member 800 may roll in a second axis (the Y-axis) direction, and the third ball member 900 may roll in the first axis (the X axis) and second axis (the Y axis) directions.

The lens driving device 500 in the example may use a closed-loop control method of sensing a position of the lens barrel 200, and providing a feedback in the shake correction process.

Accordingly, position sensors 443 and 453 for the closed-loop control may be provided, and the position sensors 443 and 453 may be disposed on internal sides or external sides of the coils 442 and 452 of the first and second shake correction driving units 440 and 450.

The position sensor 443 and 453 may be hall sensors, and the position sensor 443 and 453 may sense a position of the lens barrel 200 through the magnets 441 and 451 of the first and second shake correction driving units 440 and 450.

Figure 7:
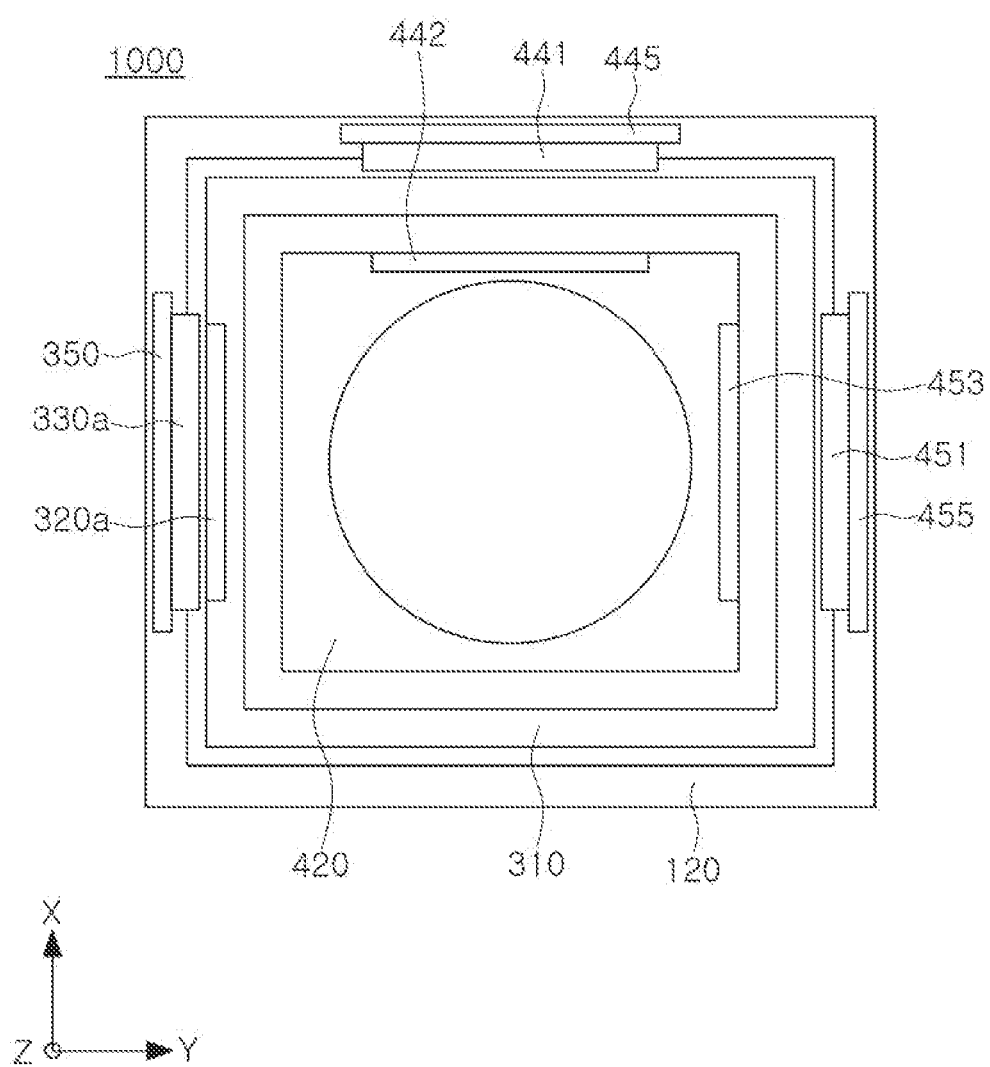
FIG. 7 illustrates a schematic plan view of an example in which an actuator is employed in an example camera module, in accordance with one or more embodiments.

FIG. 7 is a schematic plan view illustrating an example in which an actuator is employed in a camera module according to an example embodiment.

Referring to FIG. 7, a camera module 1000 in the example may prevent magnetic field leakage to all surfaces disposed in a direction perpendicular to the optical axis direction.

In the example, an actuator which may implement the focus adjustment unit 300 or the shake correction unit 400 on a surface of the housing 120 parallel to the optical axis direction, magnets 320*a*, 441, and 451 or coils 330*a*, 442, and 452, may be provided. Also, yokes 350, 445, and 455 may be provided on an external surface of the housing 120 in which the actuator implementing the focus adjustment unit 300 or the shake correction unit 400 is provided such that leakage of the magnetic field generated from the magnets 320*a*, 441, and 451 or the coils 330*a*, 442, and 452 may be prevented.

In other words, the first to third yokes 350, 445 and 455 may be provided on a side surface of the housing 120, the side surface substantially parallel to the optical axis direction, or a coil or magnet may not be provided. Accordingly, as the yoke 350, 445, and 455 may be provided on the side surface of the housing 120, or a driving actuator (for example, magnets 320*a*, 441, and 451 or coils 330*a*, 442, and 452) may not be provided, leakage of the magnetic field to other electronic components, the other camera modules, may be prevented.

Accordingly, even when the camera module 1000 in the example is installed adjacent to another camera module, magnetic field leakage may not affect the other camera module such that, when a plurality of cameras are installed adjacent to each other in a single device, flexibility in installation may improve.

Figure 8:
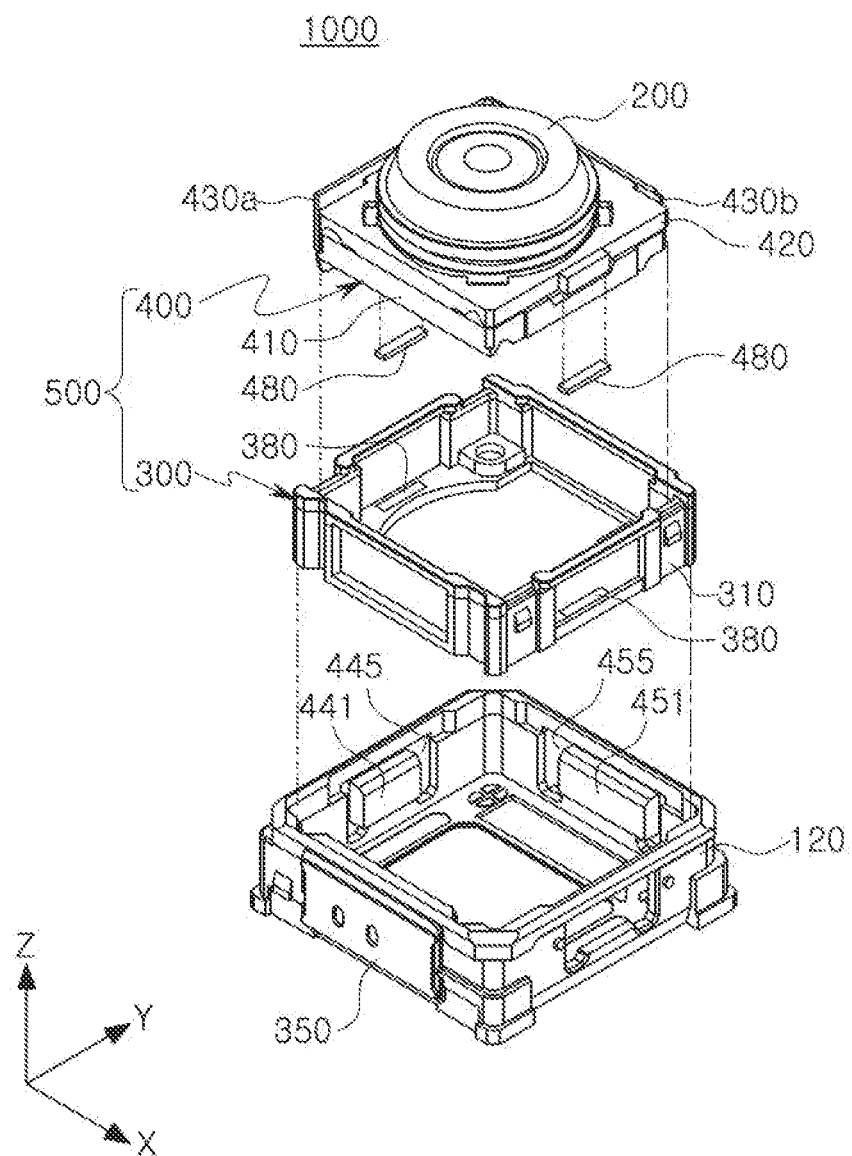
FIG. 8 illustrates an exploded perspective view of an example in which a lens module is mounted on a carrier in a camera module, in accordance with one or more embodiments.

FIG. 8 illustrates an exploded perspective view of an example lens module which is mounted on a carrier in a camera module, in accordance with one or more embodiments.

Referring to FIG. 8, a camera module 1000 in the example may selectively include a first magnetic material 480 and a second magnetic material 380 in a shake correction unit 400 and a carrier 310. Additionally, the shake correction unit 400 may be supported by a bottom surface of the carrier 310 by an attractive force between the first magnetic material 480 and the second magnetic material 380. In an example, the first magnetic material 480 and the second magnetic material 380 may be disposed to oppose each other in the optical axis direction.

Although not illustrated in detail, since the shake correction unit 400 in the example has a structure in which the frame 410 and the lens holder 420 are disposed in order on the carrier 310 with a ball member interposed therebetween, it may be desirable for the shake correction unit 400 to be supported towards the carrier 310 in the optical axis direction.

The first magnetic material 480 or the second magnetic material 380 may be a magnetic material, a material having magnetism, or a material that magnetizes in a magnetic field (including metallic or non-metallic materials). The first magnetic material 480 or the second magnetic material 380 may be, as non-limiting examples, a pulling magnet or a pulling yoke.

In an example, when the first magnetic material 480 is a pulling magnet, the second magnetic material 380 may be a pulling yoke or a pulling magnet. Additionally, when the first magnetic material 480 is a pulling yoke, the second magnetic material 380 may be a pulling magnet.

In an example, two first magnetic materials 480 may be provided along an edge of the shake correction unit 400 (the first magnetic materials 480 may be disposed symmetrically around the optical axis), and to correspond to the above configuration, two second magnetic materials 380 may be disposed to oppose the two first magnetic materials 480 in the optical axis direction along a circumference of an internal bottom surface of the carrier 310.

The shake correction unit 400 may include a frame 410 provided on the upper portion of the carrier 310 and a lens holder 420 provided on the upper portion of the frame 410, and the first magnetic material 480 may be provided in the lens holder 420 disposed in an upper portion in the optical axis direction.

Figure 9A:
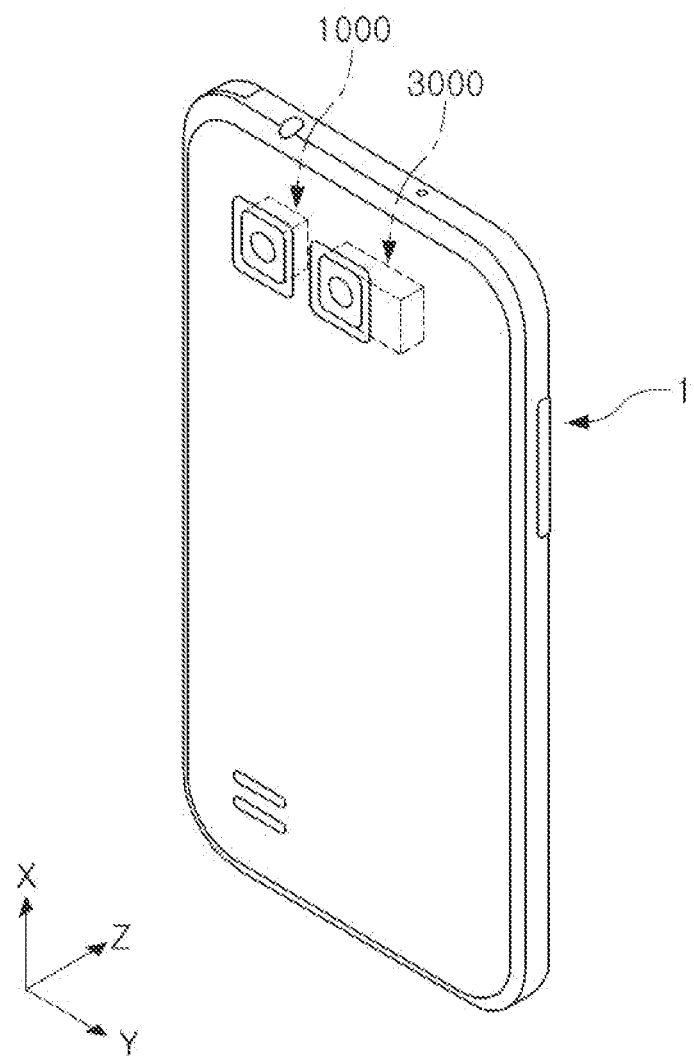
FIG. 9A illustrates a reference view of an example electronic device in which two camera modules including the camera module of an example are installed.
Figure 9B:
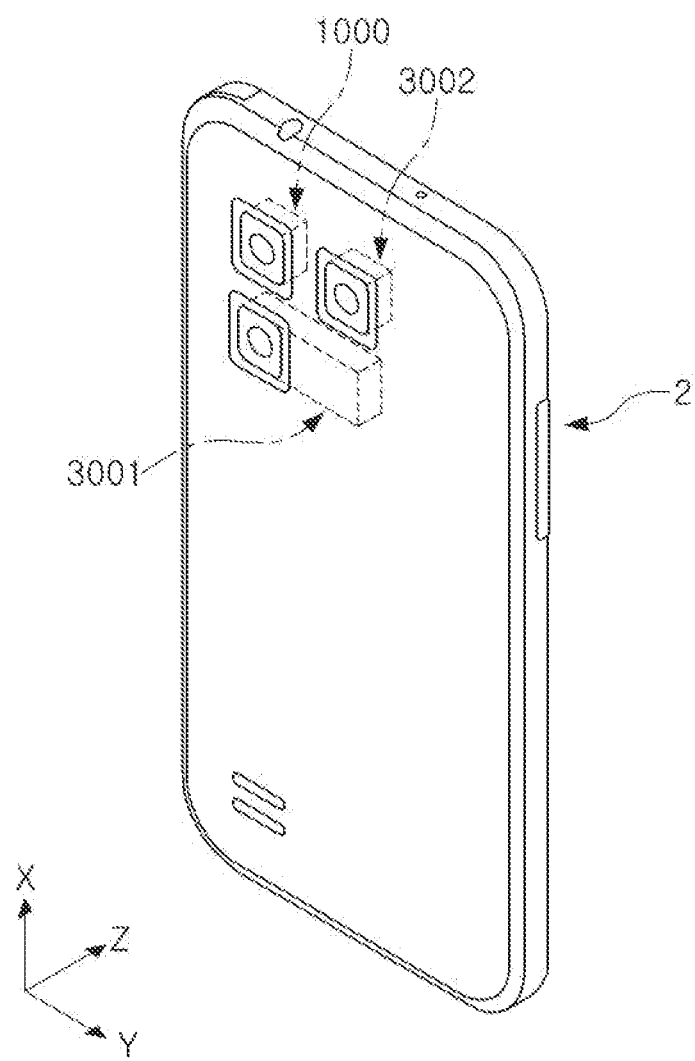
FIG. 9B illustrates a reference view of an example electronic device in which three or more camera modules including the camera module of an example embodiment are installed.

FIG. 9A is a reference view illustrating an example electronic device in which two camera modules including the camera module of an example are installed. FIG. 9B is a reference view illustrating an example electronic device in which three or more camera modules including the camera module of an example are installed.

Referring to FIGS. 9A and 9B, in an example, a plurality of camera modules may be mounted on respective portable electronic devices 1 and 2 to image a subject. In an example, the portable electronic device may include a first camera module 1000 and second camera modules 3000, 3001, and 3002. In an example, the first camera module 1000 may be the camera module described in the aforementioned example with reference to FIGS. 1 to 8.

FIG. 9A illustrates an example in which two camera modules are provided, and FIG. 9B illustrates an example in which three or more camera modules are provided. In a non-limiting example, the first camera module 1000 and the second camera modules 3000, 3001, and 3002 may be configured to have different fields of view.

As illustrated in FIG. 9A or FIG. 9B, in the camera module 1000 in the example, since yokes 350, 445, and 455 may be disposed on a side surface of the housing 120, or an actuator (e.g., the magnet 320a, 441, and 451 or the coil 330a, 442, and 452) are not provided, leakage of the magnetic field to other adjacent electronic components, the other camera modules, may be prevented. Accordingly, additional camera modules may be installed adjacent to the initial camera module 1000, and the leakage of the magnetic field one camera module may not affect the other camera modules.

Therefore, when a plurality of cameras or camera modules are installed adjacent to each other in a single device, the design of disposition may be determined without consideration of the effect of the magnetic field leakage on an adjacent camera such that there may be flexibility in installation of the plurality of cameras.

According to the aforementioned examples, the lens driving device 500 and the camera module 1000 including the same in the example may reduce magnetic field leakage while also including a shake correction function.

According to the aforementioned examples, the camera module may include an actuator which implements a magnet and a coil and may prevent magnetic flux leakage at the same time.

Additionally, in the example camera module, although different camera modules may be disposed adjacent to each other, magnetic field interference may be reduced such that there may be flexibility in disposing a plurality of cameras on a single device.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
    a housing;
    a focus adjustment unit disposed in the housing; and
    a shake correction unit disposed in the housing,
    wherein the housing comprises:
        a first shake correction driving magnet and a second shake correction driving magnet, each configured to provide a driving force to move the shake correction unit in a first direction, that intersects an optical axis, and a second direction, that intersects the optical axis and the first direction, and
        a focus adjustment driving coil, configured to provide a driving force to move the focus adjustment unit in the optical axis direction, and
    wherein the housing further comprises first to third yokes respectively disposed on a surface of the first shake correction driving magnet, a surface of the second shake correction driving magnet, and a surface of the focus adjustment driving coil.

2. The camera module of claim 1,
    wherein the housing is configured to have a polygonal box shape, and wherein the first to third yokes are disposed on respective surfaces of the housing, and are disposed in parallel to the optical axis direction.

3. The camera module of claim 1,
wherein the focus adjustment unit comprises a carrier disposed on a surface of the housing, and
wherein the carrier comprises a focus adjustment driving magnet which opposes a focus adjustment driving coil.

4. The camera module of claim 3, wherein the carrier is supported by the surface of the housing based on an attractive force between the focus adjustment driving magnet and the third yoke.

5. The camera module of claim 1,
wherein the shake correction unit comprises a lens holder, configured to hold at least one lens, and
wherein the lens holder comprises a first shake correction driving coil that opposes the first shake correction driving magnet, and a second shake correction driving coil that opposes the second shake correction driving magnet.

6. The camera module of claim 5, wherein the first shake correction driving coil and the second shake correction driving coil are connected to a flexible substrate.

7. The camera module of claim 6, wherein the flexible substrate is connected to a sensor substrate in which an image sensor is mounted.

8. The camera module of claim 6, wherein at least a portion of a connection line and a power line are separated from each other in the flexible substrate.

9. The camera module of claim 1, wherein the first to third yokes are each configured to have a size that is greater than a respective size of the first shake correction driving magnet, the second shake correction driving magnet, and the focus adjustment driving coil.

10. The camera module of claim 1,
wherein the focus adjustment unit comprises a carrier disposed on a first surface of the housing,
wherein the shake correction unit and the carrier selectively comprise a first magnetic material and a second magnetic material, and
wherein the shake correction unit is supported by a bottom surface of the carrier based on an attractive force of the first magnetic material and the second magnetic material.

11. The camera module of claim 10, wherein the carrier is supported by a surface of the housing disposed in parallel to the optical axis direction with a ball member interposed therebetween.

12. The camera module of claim 10, wherein the shake correction unit comprises a frame disposed in an upper portion of the carrier in the optical axis direction, and a lens holder disposed in an upper portion of the frame in the optical axis direction.

13. The camera module of claim 12,
wherein a first ball member is disposed between the frame and the lens holder, and
wherein a second ball member is disposed between the carrier and the frame.

14. A camera module, comprising:
a housing;
a focus adjustment unit disposed in the housing; and
a shake correction unit disposed in the focus adjustment unit,
wherein the focus adjustment unit comprises a carrier disposed in the housing, and configured to move in an optical axis direction, wherein the shake correction unit comprises a frame disposed in an upper portion of the carrier in the optical axis direction, and a lens holder disposed in an upper portion of the frame in the optical axis direction,
wherein the frame and the lens holder are configured to move in first and second directions intersecting the optical axis direction based on an interaction between a shake correction driving coil and a shake correction driving magnet,
wherein the shake correction unit and the carrier selectively comprise a first magnetic material and a second magnetic material, and
wherein the shake correction unit is supported by a bottom surface of the carrier based on an attractive force of the first magnetic material and the second magnetic material.

15. The camera module of claim 14, wherein the first magnetic material is a pulling magnet, and the second magnetic material is a pulling yoke.

16. A portable electronic device, comprising:
a plurality of camera modules, each configured to have a different field of view,
wherein at least one of the plurality of camera modules comprises:
a housing;
a focus adjustment unit disposed in the housing; and
a shake correction unit disposed in the housing,
wherein the housing comprises:
a first shake correction driving magnet and a second shake correction driving magnet, each configured to provide a driving force to move the shake correction unit in a first direction, that intersects an optical axis, and a second direction, that intersects the optical axis and the first direction, and
a focus adjustment driving coil, configured to provide a driving force to move the focus adjustment unit in the optical axis direction, and
wherein the housing further comprises first to third yokes respectively disposed on a surface of the first shake correction driving magnet, a surface of the second shake correction driving magnet, and a surface of the focus adjustment driving coil.

17. A portable electronic device, comprising:
a plurality of camera modules, each configured to have a different field of view,
wherein at least one of the plurality of camera modules comprises:
a housing;
a focus adjustment unit disposed in the housing; and
a shake correction unit disposed in the focus adjustment unit,
wherein the focus adjustment unit comprises a carrier disposed in the housing, and configured to move in an optical axis direction,
wherein the shake correction unit comprises a frame disposed in an upper portion of the carrier in the optical axis direction, and a lens holder disposed in an upper portion of the frame in the optical axis direction,
wherein the frame and the lens holder are configured to move in first and second directions intersecting the optical axis direction based on an interaction between a shake correction driving coil and a shake correction driving magnet,
wherein the shake correction unit and the carrier selectively comprise a first magnetic material and a second magnetic material, and wherein the shake correction unit is supported by a bottom surface of the carrier based on an attractive force of the first magnetic material and the second magnetic material.

* * * * *